(12) United States Patent
Algüera Gallego et al.

(10) Patent No.: US 7,128,340 B1
(45) Date of Patent: Oct. 31, 2006

(54) SUPPORT DEVICE

(75) Inventors: José Manuel Algüera Gallego, Aschaffenburg (DE); Gerald Müller, Obertshausen (DE); Steffen Pfister, Langen (DE)

(73) Assignee: Jost-Werke GmbH & Co. KG., Frankfurt am Main (DE)

( * ) Notice: Subject to any disclaimer, the term of this patent is extended or adjusted under 35 U.S.C. 154(b) by 104 days.

(21) Appl. No.: 10/130,893

(22) PCT Filed: Nov. 23, 2000

(86) PCT No.: PCT/EP00/11666

§ 371 (c)(1),
(2), (4) Date: Sep. 3, 2002

(87) PCT Pub. No.: WO01/40037

PCT Pub. Date: Jun. 7, 2001

(30) Foreign Application Priority Data

Nov. 27, 1999 (DE) ................. 199 57 244

(51) Int. Cl.
*B60S 9/02* (2006.01)
(52) U.S. Cl. .................. 280/763.1; 248/188.8
(58) Field of Classification Search ............ 280/763.1, 280/764.1, 765.1, 766.1, 475; 212/301, 302, 212/303, 304, 305; 248/188.8
See application file for complete search history.

(56) References Cited

U.S. PATENT DOCUMENTS 2,162,181 A * 6/1939 Skinner .................. 248/354.1
3,033,001 A * 5/1962 Russell et al. ................. 91/523
3,666,290 A 5/1972 Dalton et al.
3,751,067 A 8/1973 Claflin et al.
3,897,083 A * 7/1975 Pickering .................. 280/763.1
3,989,276 A 11/1976 Hamerl
4,462,612 A * 7/1984 Dreyer et al. ............ 280/766.1
4,634,144 A * 1/1987 Ringe ..................... 280/763.1
4,824,136 A * 4/1989 Baxter ........................ 280/475
5,054,805 A * 10/1991 Hungerink et al. ......... 280/475
5,509,687 A * 4/1996 Thorndike ............... 280/766.1
5,527,054 A * 6/1996 Williams .................... 280/475

FOREIGN PATENT DOCUMENTS

| DE | 31 19 359 | 12/1982 |
| DE | 33 06 789 | 8/1984 |
| DE | 40 24 825 C1 * | 10/1991 |
| DE | 40 14 296 C1 * | 1/1992 |
| EP | 322 634 | 7/1989 |
| EP | 430 643 | 6/1991 |
| GB | 2 207 102 | 1/1989 |

* cited by examiner

*Primary Examiner*—Frank Vanaman
(74) *Attorney, Agent, or Firm*—Hudak, Shunk & Farine Co. LPA

(57) ABSTRACT

A support device for semi-trailers including a leg which has a receiving device, on its lower end. The support leg has a base element with a base plate, whereby the base element is fastened to the base receiving device by a fixing device. The base element is connected by a pivot bearing device with the support leg, whereby the pivot bearing device is located below the damping element. The compression of the damping element is therefore fully decoupled from the pivoting movement of the base element.

19 Claims, 7 Drawing Sheets

SUPPORT DEVICE

FIELD OF THE INVENTION

This invention relates to a support device for semi-trailer with a support leg, on the lower end of which a base receiving device is located, and with a support base with a base plate, with at least one damping element, with a pivot bearing device and with a holder for fastening the support base to the base receiving device.

BACKGROUND OF THE INVENTION

Support devices are generally located in pairs on the underside of semi-trailers in their forward areas, and are always used when the semi-trailer is separated from its tractor and is parked by itself. In systems of the prior art, on semi-trailers with air springs, air will almost inevitably have escaped from the springs after the semi-trailer has been parked for a more or less long period of time, as a result of which the rear portion of the semi-trailer droops and the semi-trailer assumes a diagonal position or a position in which it tilts toward the rear in relation to the ground. For this purpose, the support bases or their base plates must be able to swivel, to compensate for this inclined position. The same requirement applies if the semi-trailer is parked on ground that is uneven or not level. In addition to the pivoting capability of the base or of the base plate, it is desirable that, as the support devices are being extended, the movable parts of the support device come to rest gently on the ground so that they are not damaged. For this purpose, corresponding damping elements are located in the support bases.

Because it is very difficult to satisfy all these peripheral requirements with only one model of the base, the general practice is to install different model bases as a function of the conditions in which they will be used.

The required model must generally be defined prior to the purchase of the support winch, because the support base is a component of the winch, and must accordingly be mounted on it.

The different realization of the base generally also requires different arrangements and preparatory steps on the support winch itself. Consequently, there is a specific model of support winch for each type of base. This has the advantage that the base and the support winch can be optimally coordinated with each other, although that, too, has several disadvantages.

For example, during the process of manufacturing the support winch, a great many different manufacturing operations have to be performed for each model, which entails a correspondingly high cost for tools, jigs, inventories of material, space and logistics. Moreover, once the support winch has been manufactured, it is generally no longer possible for the final consumer or the retail dealer to exchange different base models for one another.

It is therefore desirable to develop different model bases that can be used in as many applications as possible, and accordingly have a wide range of potential applications.

The prior art includes one model of a foot which is essentially a rigid structure which has a plate-shaped ground contact surface and can pivot around an axle which is mounted horizontally in the inner tube of the support winch, transverse to the direction of travel. The support foot can adapt to certain inclinations of the road, e.g. entrance ramps, hills and similar inclinations, and can thus be used to park the semi-trailer.

As a result of the inherently rigid realization of the support base, however, impact loads of the type that occur, for example, during the shunting of the semi-trailer, are transmitted directly to the support winch and indirectly to the vehicle. Ultimately, these impacts can lead to disruptions in operation or even damage to both the winch and the vehicle.

To reduce such damage or to eliminate it altogether, there are models of bases that have elastic elements that absorb the kinematic energy of the impact and can thus protect the mechanical components.

DE 31 19 359 A1 discloses a support device in which, on the lower end of the support part to be deployed, there is a ground plate that projects laterally beyond this support part, whereby between this ground plate and the base plate there is an elastic pressure body which is designated the damping element and is made of rubber. A retaining ring that is welded to the base plate has an upper peripheral segment that overlaps and grips the laterally projecting ring-shaped portion of the ground plate, whereby there is a certain amount of play between the retaining ring and the extendable support part. The pivot angle and the deflection travel of the base plate are limited by the compressibility of the elastic pressure body and the distance between the retaining ring and the extendable support part. In this support device there is no pivot bearing. This design gives the base plate only a limited ability to adapt to major uneven spots in the ground, whereby the damping element is deformed both when the base is set down in the vertical direction, as well as when the base is tipped.

EP 0 430 643 A2 discloses a support base, in which the fastening to the base receiving device is identical with the pivot bearing of the base. A tubular bearing element is located in a rectangular housing of the base retaining device and is held so that it can move vertically in slots in two vertical plates that are fastened to the base plate. Between the housing and the base plate there is a damping element which is compressed when the base is set down. An additional deformation in the transverse direction occurs when the base pivots, as a result of which the housing must be pushed over the damping element. This arrangement has a number of disadvantages.

The damping element is exposed to significant and different loads, which leads to rapid material fatigue. The pivoting process is prevented and limited by the damping element. When the support base is retracted, it remains in its pivoted position, because the damping element prevents it from pivoting back into its initial position. When the support base is lowered again, the damping element can interfere with the free movement of the base and damage it.

U.S. Pat. No. 3,666,290 describes a support base in which there are two damping elements between a plate attached to the end surface of the support tube and the base plate. Above the damping element, there is a pivot bearing which consists of a bolt inserted through the support tube, which is oriented so that it can move in two slots of two vertical plates fastened to the base plate. In this arrangement of the support base, too, the damping elements are additionally deformed during pivoting, as a result of which the pivot angle is limited.

SUMMARY OF THE INVENTION

Starting from the prior art as described in U.S. Pat. No. 3,666,290, the object of the invention is to create a support device with a support base which has an improved pivoting capability, whereby an additional object is to subject the damping element to reduced deformation.

The invention teaches that this object is achieved with a support device in which the pivot bearing device is located below the damping element.

Consequently, the compression of the damping element is completely isolated from the pivoting motion of the support base. The pivoting movement of the support base is not interfered with by the damping element, and conversely, the pivoting movement does not cause any additional deformation of the damping element. When the base is set down, the damping element is compressed only in the vertical direction.

An additional advantage is that the bending forces that are exerted when loads are exerted on the support device can be absorbed much more effectively, which means that the pivot bearing device is located at the lowest point of the support device. Accordingly, the vertically oriented bearing plates that are fastened to the base plate can also be made shorter than is possible on support bases of the prior art.

Preferably, the damping element is supported on a non-rotating component of the pivot bearing device. The construction that results is compact overall in relation to its height.

The fixing device is preferably located so that the support base can be fastened so that it can move in the vertical direction on the base receiving device. This mobility is necessary so that when a load is exerted, the base can move relative to the support leg and thus the damping element can perform its function.

For this purpose, the fixing device can have two vertically oriented slots.

The pivot bearing device is also advantageously fastened to the fixing device.

As a result of this measure, the fixing device is moved in the base holder device only in the vertical direction, which means that the damping element is only compressed, whereby, however, the pivoting capability of the base plate is guaranteed by the simultaneous location of the pivot bearing device on the fixing device.

The pivot bearing device advantageously has at least one horizontal bearing element and two bearing plates that are located vertically on the base plate, which bearing plates are mounted so that they can pivot on the bearing element.

The bearing element is advantageously a tube which is inserted into the fixing device.

In a further realization of the invention, the fixing device is preferably a U-shaped stirrup with two erect legs, whereby in each leg there are two openings, one above the other, for fastening to a base holder device and to hold the pivot bearing device.

In a further embodiment of the invention, the fixing device can consist of two oblong retaining plates, whereby in each plate there are two openings, one above the other, for fastening to a base holder device and to hold the pivot bearing.

The upper openings in these two realizations are formed by the above-mentioned slots.

On the bearing element, there are preferably at least two stabilizer toes that are located opposite each other on the base element receiving device and extend through the damping element. The purpose of these elements is to prevent the bearing element, which is located below the damping element, from executing a pivoting movement. This measure is appropriate if the fixing device would permit a pivoting movement in addition to the vertical mobility on the base element holding device. This precaution prevents the damping element from being subjected to a deformation in the horizontal direction in addition to compression. The result is an overall stable arrangement of the fixing device, whereby the pivoting movement is restricted exclusively to the pivot bearing device.

BRIEF DESCRIPTION OF THE DRAWINGS

Advantageous realizations of the invention are described in greater detail below with reference to the exemplary embodiments illustrated in the accompanying drawings, in which.

DETAILED DESCRIPTION OF THE INVENTION

Figure 1:
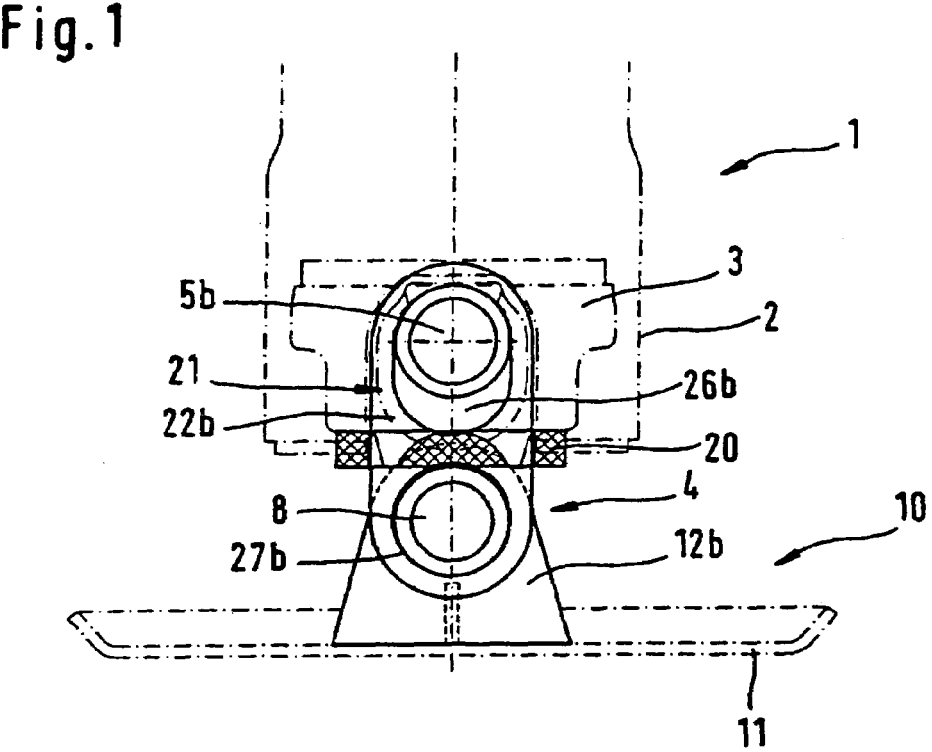
FIG. 1 illustrates a side view of a support device with a support base, with no load.

FIG. 1 shows a support device with a support leg 1, of which only the lower end of a telescoping support tube 2 is visible. Fastened in the support tube 2 is a foot receiving device 3 which has two outwardly projecting bolts 5a and b. Located on these bolts 5a, b is a fixing device 21 in the form of two retaining plates 22a, b, each of which has two vertically oriented slots 26a, b. This arrangement guarantees that the retaining plates 22a, b are movable in the vertical direction.

Below the slots 26a, b there are additional openings 27a, b, in which a horizontal bearing element 8 in the form of a bolt or tube is inserted. This bearing element 8 is a component of the pivot bearing device 4 for the support base 10. The latter has a base plate 11 onto which two vertical plates 12a, b are fastened. These plates 12a, b can rotate on the bearing element 8 and allow a pivoting of the support foot 10 around the pivoting axis 6.

Figure 2:
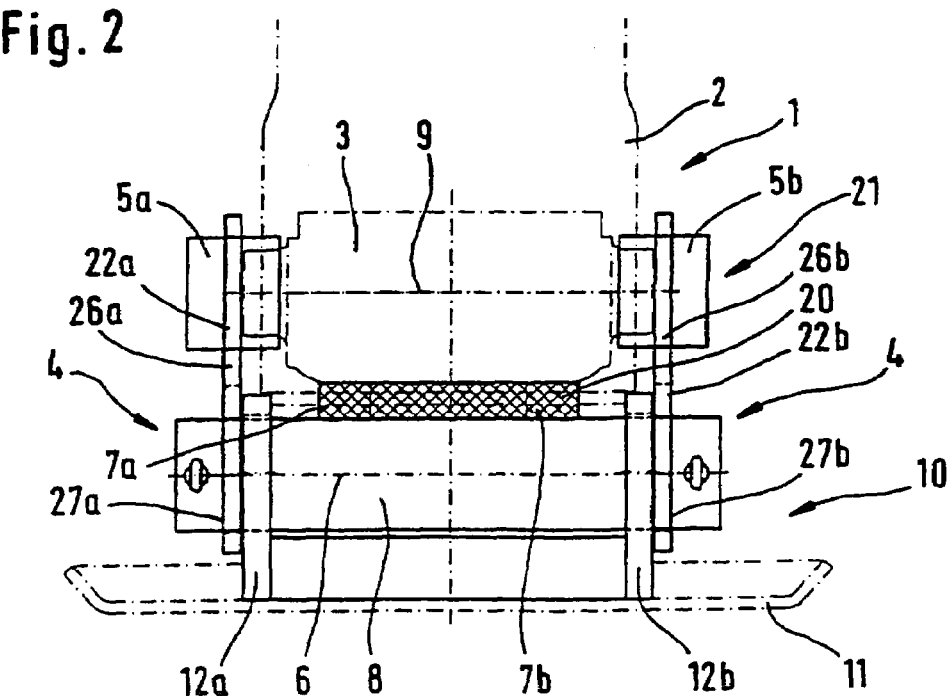
FIG. 2 is a front view of the support device illustrated in FIG. 1.

As shown in FIG. 2, the two vertical holder plates 12a, b are located between the retaining plates 22a, b.

On the underside of the base-receiving device 3 there is a damping element 20 in the form of an elastic plate. This damping element 20 is supported on a non-rotating component, namely on the bearing element 8. Furthermore, on the underside of the foot-receiving device 3 there are two additional stabilizing toes 7a, b which are engaged on the bearing element 8 and prevent a pivoting of the pivot bearing device 4 around the axis 9 of the base receiving device 3. It is thereby not necessary to take additional measures on the retaining plates 22a, b to prevent a pivoting on the bolts 5a, b.

Figure 3:
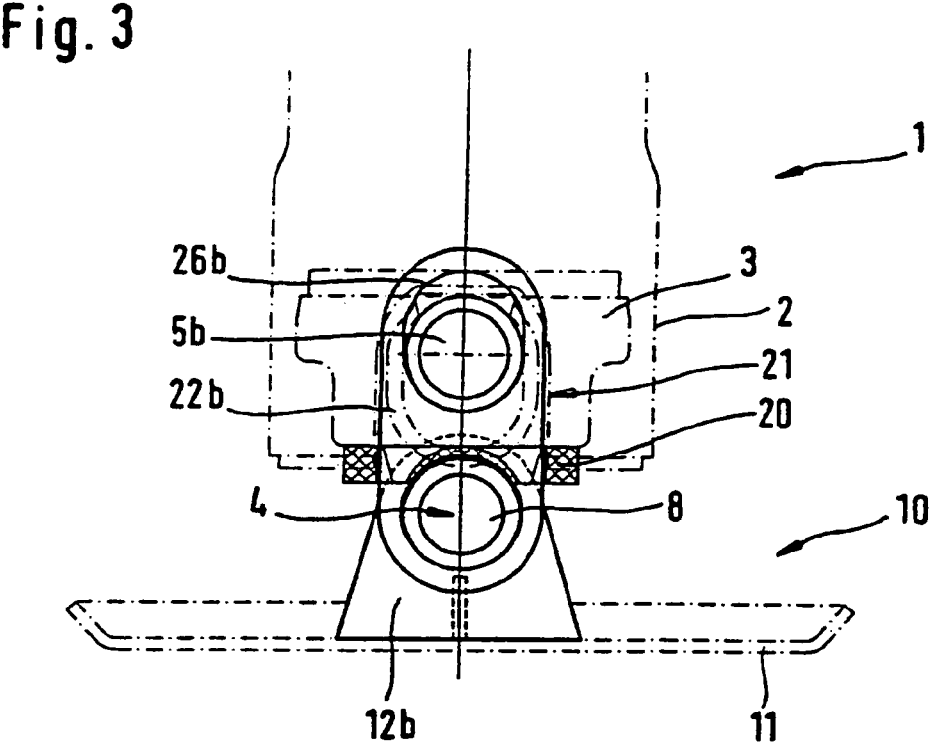
FIG. 3 illustrates the support device of FIG. 1 under load.
Figure 4:
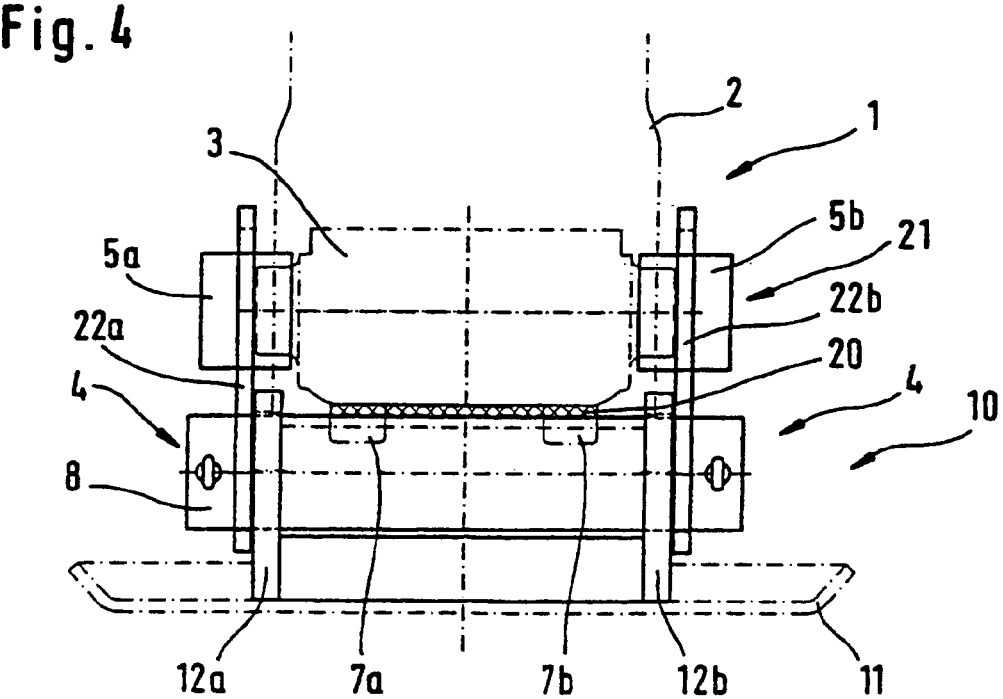
FIG. 4 illustrates the support device illustrated in FIG. 2 under load.

FIGS. 3 and 4 show the same exemplary embodiment as in FIGS. 1 and 2, but in a loaded condition. The figures show clearly that the retaining plate 22b has been displaced in the corresponding slot 26b, as a result of which the support leg 2 and the support base 10 have come closer together. As a result of this process, the damping element 20 is compressed in its middle area, where it rests on the bearing element 8. The damping element 20 does not need to have the width shown in FIGS. 1 to 5, because only the middle area of the damping element is loaded in compression. However, the width shown has been found to be advantageous, because an additional fixing of the damping element in position can be achieved by the stabilizer toes 7a, b which extend through the damping element 20. In this case, a corresponding size of the damping element is advantageous.

Figure 5:
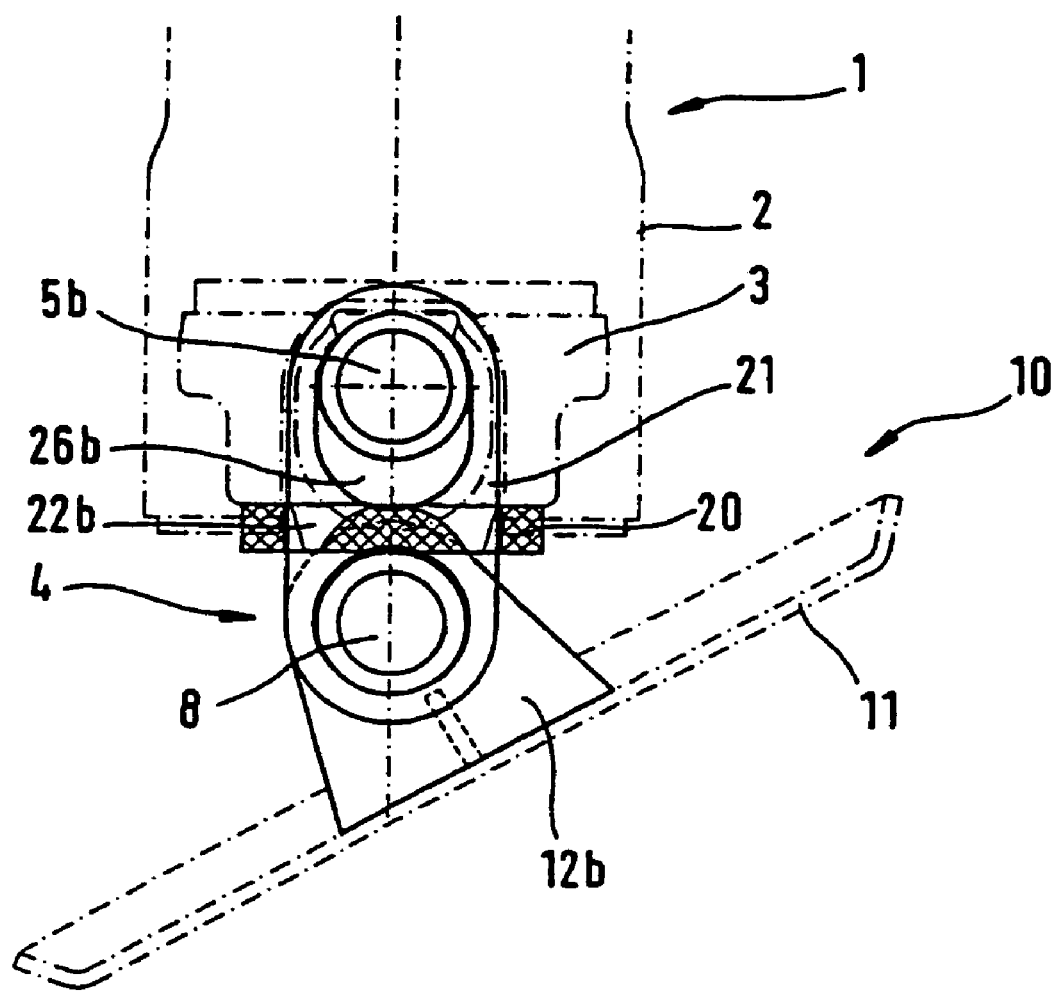
FIG. 5 illustrates the support device in side view with a pivoted support base.

FIG. 5 shows this same realization with a pivoted support base 10. It is clearly apparent that the pivoting of the support base is independent of the deformation of the damping element 20, and that the damping element does not interfere with the pivoting of the support base 10. The two processes are completely decoupled from each other.

Figure 6:
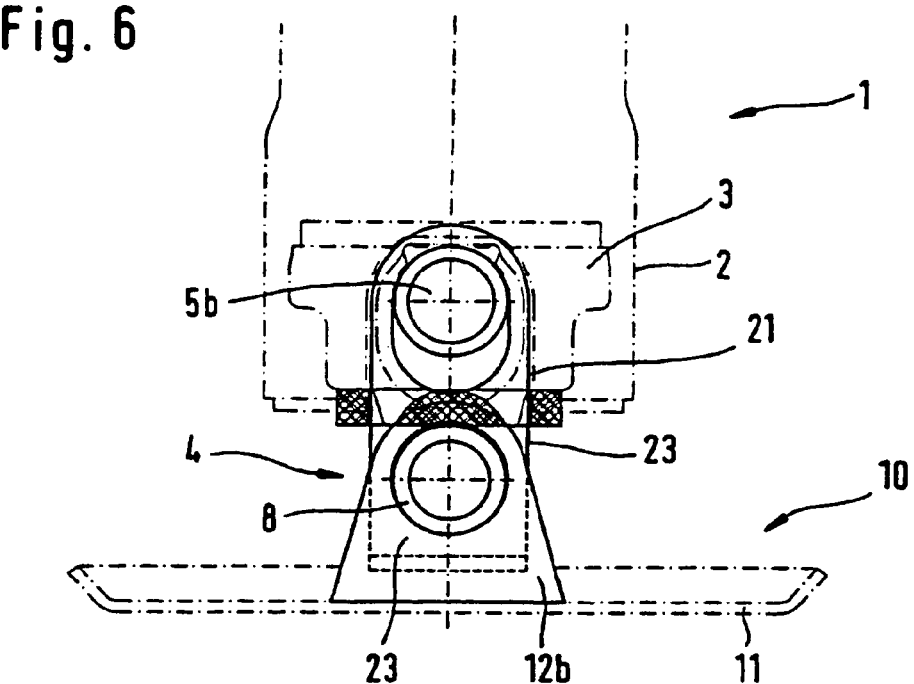
FIG. 6 illustrates a further embodiment of a support device in side view with no load.
Figure 7:
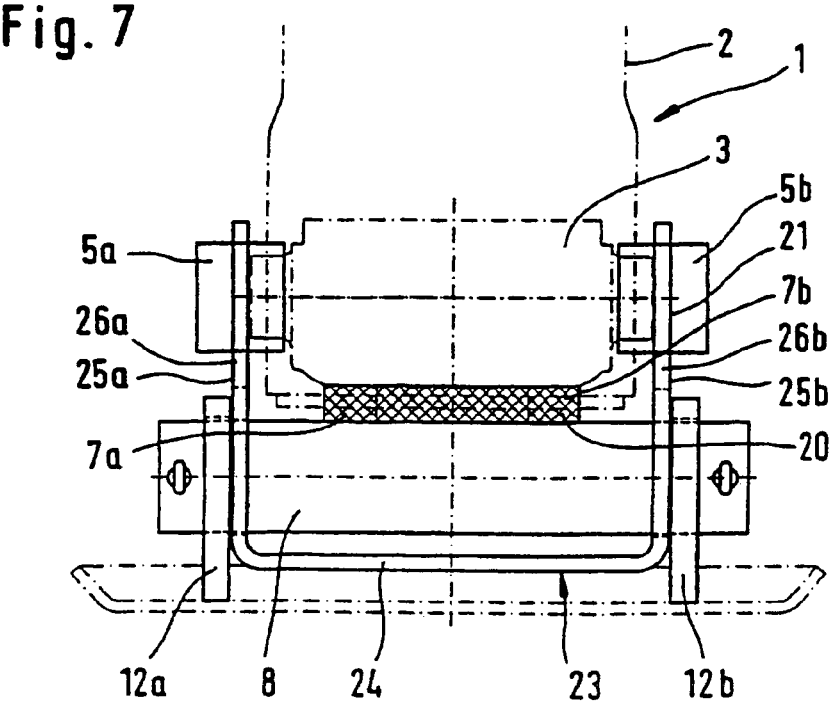
FIG. 7 illustrates a front view of the embodiment shown in FIG. 6 with no load.

FIGS. 6 and 7 show another embodiment of the invention in the unloaded condition. In contrast to the preceding embodiment illustrated in FIGS. 1 to 5, the fixing device 21 is formed, instead of by the retaining plates 22a, b, by a U-shaped stirrup 23 which has two projecting legs 25a, b which perform the function of the two retaining plates 22a, b. Increased stability is achieved as a result of the connection of the two legs 25a, b via the center part 24. Moreover, compared to the embodiment described above, the system of the vertical plates 12a is replaced by the legs 25a, b.

Figure 8:
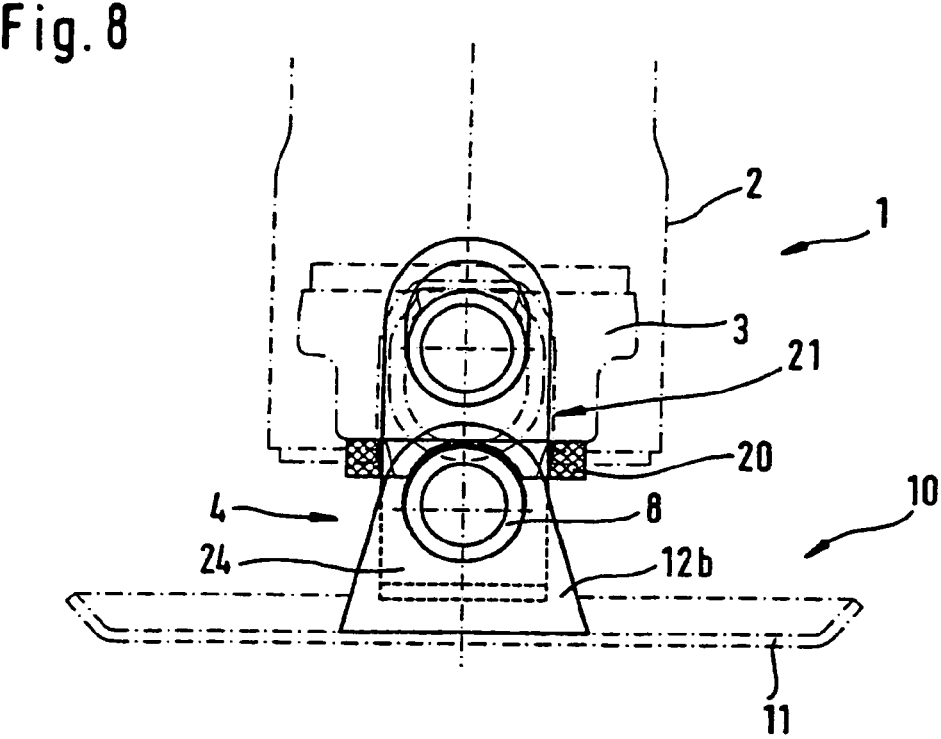
FIG. 8 illustrates the support device shown in FIG. 6 under load.
Figure 9:
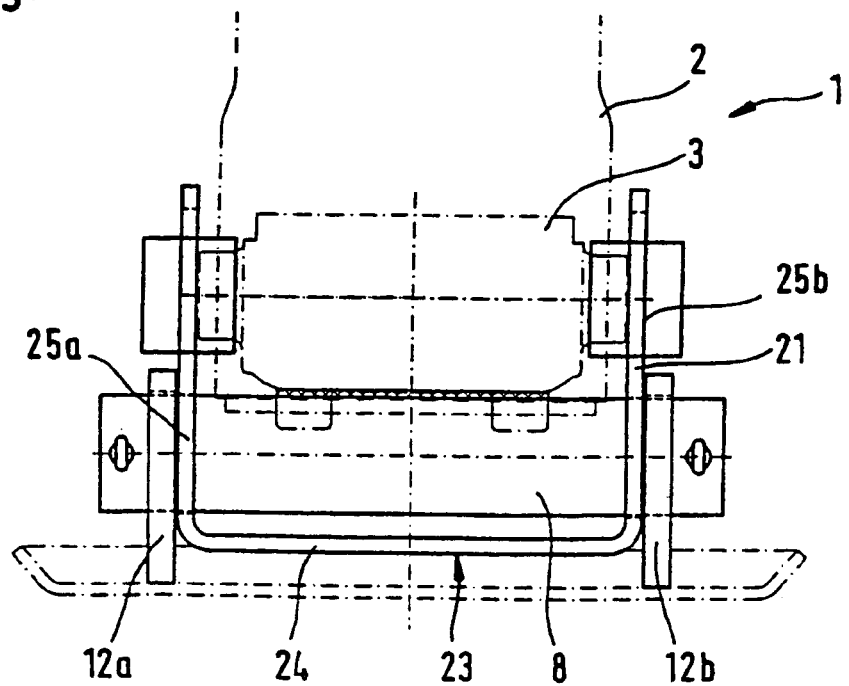
FIG. 9 illustrates the support device shown in FIG. 7 under load.
Figure 10:
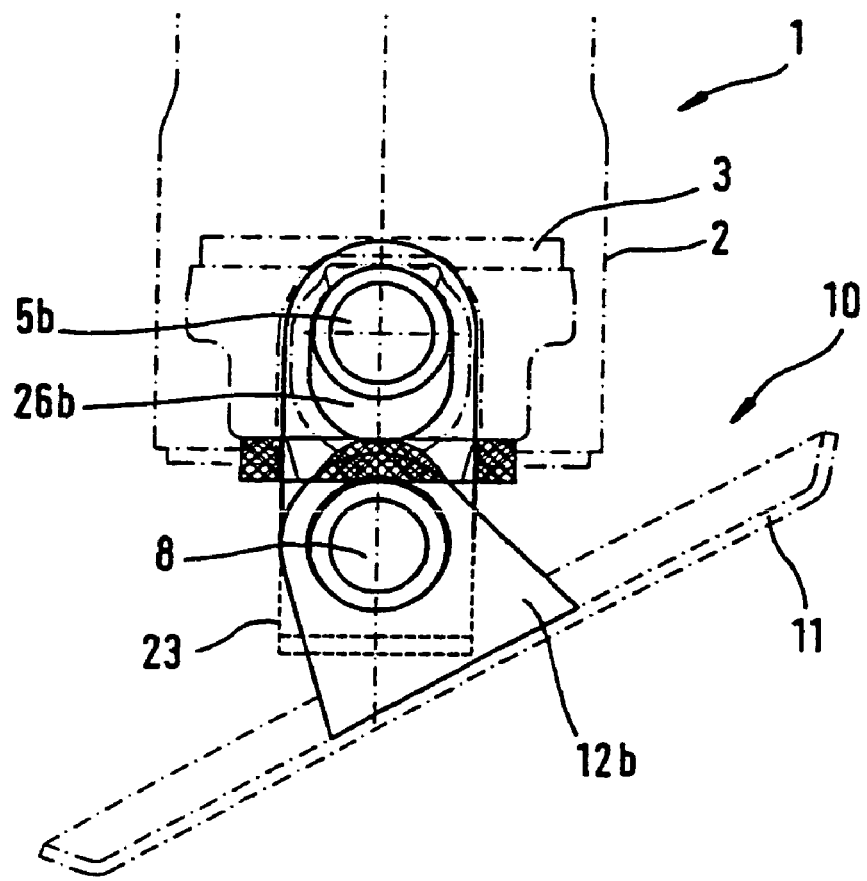
FIG. 10 illustrates the support device of FIG. 6 shown in side view with a pivoted support base.

FIGS. 8 and 9 show this embodiment in the loaded condition, and FIG. 10 shows it with a pivoted support base 10.

Figure 11:
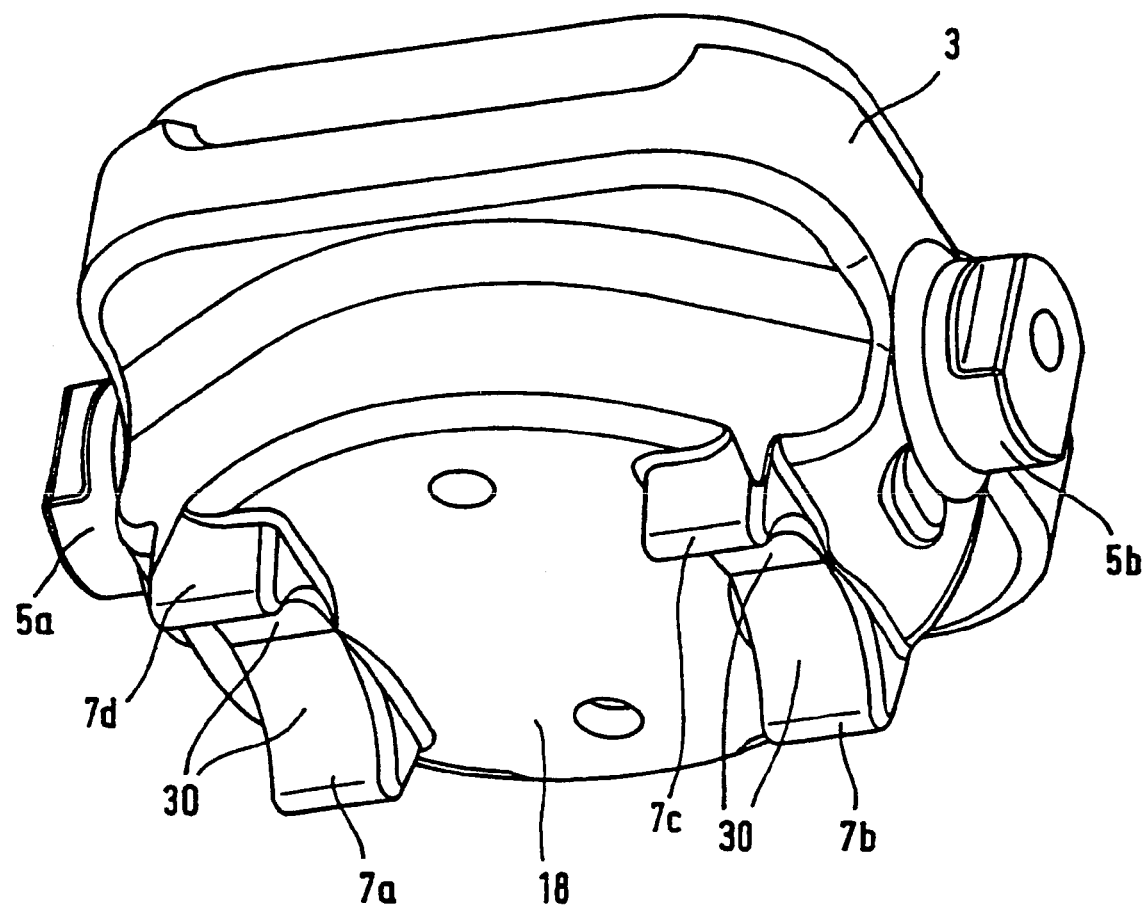
FIG. 11 is a perspective view of the base receiving device.

FIG. 11 shows a view from below and in perspective of the base receiving device 3. On the bottom wall 18 there are four stabilizer toes 7a–d, which extend through the damping element 20. Each toe 7a–d has a curved surface 30 facing downward, which can be in contact with the bearing element 8. The curvature of the surface 30 is adapted to the cylindrical shape of the bearing element 8. Each two toes 7a, d and 7b, c surround the roller 21 in pairs and thereby prevent the lateral movement of the damping element 20.

The invention claimed is:

1. A support device for semi-trailers with a support leg, comprising: a base receiving device adapted to be connected in a lower end of the support leg, and a support base with a base plate, with at least one damping element, with a pivot bearing device and with a fixing device for fastening the support base to the base receiving device, wherein the pivot bearing device is located below the damping element, wherein the damping element is located between the pivot bearing device and the base receiving device, wherein the fixing device is movable in a vertical direction relative to the base receiving device, and wherein the support base pivots independently of the deformation of the at least one damping element.

2. A support device according to claim 1, wherein the damping element is supported on a non-rotatable component of the pivot bearing device.

3. A support device according to claim 1, wherein the fixing device has two vertically oriented slots.

4. A support device according to claim 1, wherein the pivot bearing device is fastened to the fixing device.

5. A support device according to claim 1, wherein the pivot bearing device has at least one horizontal bearing element and two bearing plates located vertically on the base plate, which are pivotably mounted on the bearing element.

6. A support device according to claim 5, wherein the bearing element is a tube which is inserted into the fixing device.

7. A support device according to 1, wherein the fixing device is a U-shaped stirrup with two erect legs, whereby on each leg, one above the other, there are two openings for fastening to the base receiving device and for receiving the pivot bearing device.

8. A support device according to claim 1, wherein the fixing device consists of two oblong retaining plates, whereby on each plate, one above the other, there are two openings for fastening to the base receiving device and for receiving the pivot bearing device.

9. A support device according to claim 1, wherein on the pivot bearing device there are at least two stabilizer toes that are located opposite each other on the base receiving device and extend through the damping element.

10. A support device according to claim 1, wherein the base receiving device is fastened in a support tube on the lower end of the support leg.

11. A support device according to claim 10, wherein the damping element is supported on a non-rotatable component of the pivot bearing device, wherein the fixing device has two vertically oriented slots; and wherein the pivot bearing device is fastened to the fixing device.

12. A support device according to claim 11, wherein the pivot bearing device has at least one horizontal bearing element and two bearing plates located vertically on the base plate, which are pivotably mounted on the bearing element; and wherein the bearing element is a tube which is inserted into the fixing device.

13. A support device according to claim 12, wherein the fixing device is a U-shaped stirrup with two erect legs, whereby on each leg, one above the other, there are two openings for fastening to the base receiving device and for receiving the pivot bearing device.

14. A support device according to claim 12, wherein the fixing device consists of two oblong retaining plates, whereby on each plate, one above the other, there are two openings for fastening to the base receiving device and for receiving the pivot bearing device.

15. A support device for semi-trailers with a support leg, comprising: a base receiving device adapted to be connected in a lower end of the support leg, and a support base with a base plate, with at least one damping element, with a pivot bearing device and with a fixing device for fastening the support base to the base receiving device, wherein the pivot bearing device is located below the damping element, wherein the damping element is located between the pivot bearing device and the base receiving device, and wherein the fixing device consists of two oblong retaining plates, whereby on each plate, one above the other, there are two openings for fastening to the base receiving device and for receiving the pivot bearing device.

16. A support device according to claim 15, wherein the damping element is supported on a non-rotatable component of the pivot bearing device; and wherein the fixing device is movable in the vertical direction on the base receiving device.

17. A support device according to claim 16, wherein the fixing device has two vertically oriented slots; and wherein the pivot bearing device is fastened to the fixing device.

18. A support device according to claim 17, wherein the pivot bearing device has at least one horizontal bearing element and two bearing plates located vertically on the base plate, which are pivotably mounted on the bearing element; and wherein the bearing element is a tube which is inserted into the fixing device.

19. A support device according to claim 18, wherein on the pivot bearing device there are at least two stabilizer toes that are located opposite each other on the base receiving device and extend through the damping element.

* * * * *